United States Patent [19]
Yoshida

[11] Patent Number: 5,287,760
[45] Date of Patent: Feb. 22, 1994

[54] POWER TRANSMISSION DEVICE FOR PRESS MACHINE

[75] Inventor: Akihiro Yoshida, Gifu, Japan

[73] Assignee: Kabushiki Kaisha Yamada Dobby, Bisai, Japan

[21] Appl. No.: 972,161

[22] Filed: Nov. 5, 1992

[30] Foreign Application Priority Data

Jul. 24, 1992 [JP] Japan .................. 4-217536

[51] Int. Cl.⁵ .................. F16H 21/00; F16H 21/18
[52] U.S. Cl. .................. 74/68; 74/393
[58] Field of Search .................. 74/68, 393; 100/282, 100/283

[56] References Cited

U.S. PATENT DOCUMENTS

| | | | |
|---|---|---|---|
| 2,286,694 | 6/1942 | Talbot | 74/393 X |
| 2,783,589 | 3/1957 | Wiley | 74/393 X |
| 3,368,414 | 2/1968 | Scholin et al. | 74/68 |
| 4,697,466 | 10/1987 | Sugawara et al. | 74/68 X |

FOREIGN PATENT DOCUMENTS

| | | | |
|---|---|---|---|
| 906877 | 2/1954 | Fed. Rep. of Germany | 74/68 |
| 60-124498 | 7/1985 | Japan . | |
| 3-47686 | 5/1991 | Japan . | |

Primary Examiner—Allan D. Herrmann
Attorney, Agent, or Firm—Stoel Rives Boley Jones & Grey

[57] ABSTRACT

A power transmission device of a press machine comprises a rotary shaft rotated around a first axis by the rotation of a flywheel and an arm mounted on the rotary shaft and pivotally connected to a first link. A second link is pivotally connected to the first link so as to be rotated around a second axis, eccentric from the first axis, by the rotation of the arm. A lever is pivotally connected to the second link so as to be rotated around the first axis by the rotation of the second link and is also connected to a crankshaft so as to rotate the crankshaft. A rotor and guide constrain the rotary motion of the second link relative to the second axis to movement along a hypothetical circle centered on the second axis. The second link is engaged with the rotor at an engagement portion moved along the hypothetical circle in accordance with the rotation of the second link, whereby a uniform rotary motion is converted into a non-uniform rotary motion without using any gear and without making rotation axes of input and output shafts eccentric from each other.

9 Claims, 15 Drawing Sheets

POWER TRANSMISSION DEVICE FOR PRESS MACHINE

BACKGROUND OF THE INVENTION

1. Field of the Invention

This invention relates to a power transmission device for a press machine for transmitting the rotary motion of a fly-wheel.

2. Description of the Prior Art

As for one of power transmission devices for a press machine for converting the uniform rotary motion of a fly-wheel into a non-uniform rotary motion and transmitting the non-uniform rotary motion to a crankshaft, there is a device comprising a pinion rotated around a rotation axis of a fly-wheel upon receipt of the rotation of the fly-wheel, a main gear geared with the pinion, and a pair of links for transmitting the rotation of the main gear to the crankshaft (refer to, e.g., Japanese Patent Public Disclosure (KOKAI) No. 60-124498). One of the links is pivotally connected to an eccentric portion of the main gear at one end thereof, and the other link is pivotally connected to the other end of the one link and fixed to the crankshaft.

In the conventional power transmission device using gears, however, the rotation axes of both gears are separated from each other, and therefore, an unbalanced force acts between both gears, resulting in the generation of vibration. In addition, the power transmission device is larger than the dimension corresponding to the distance between the rotation axes of both gears, and, what is more, complicated.

As for the other one of the power transmission devices for a press machine for converting the uniform rotary motion of a fly-wheel into a non-uniform rotary motion and transmitting the non-uniform rotary motion to a crankshaft, there is a device comprising a rotary shaft rotated by a fly-wheel, a first arm mounted on the rotary shaft, a second arm mounted on the crankshaft, and a link pivotally connected to first and second arms at different portions (Japanese Utility Model Public Disclosure (KOKAI) No. 1-108365) issued May 2, 1991, no. 3-47686.

In the conventional power transmission device using the arms and the link, however, both arms are just pivotally connected by the link and the rotation axis of an input shaft (the rotary shaft mentioned above) cannot be substantially coincided with that of an output shaft. As a result, vibration is generated due to the eccentricity between the rotation axis of the input shaft and that of the output shaft (a shaft rotated by the second arm), and a casing for supporting the input shaft is required. Suppose the rotation axis of the input shaft is coincided with that of the output shaft in this conventional device, the uniform rotary motion of the input shaft is only transmitted to the output shaft as it is and the uniform rotary motion cannot be converted into any non-uniform rotary motion.

SUMMARY OF THE INVENTION

An object of the present invention is to convert a uniform rotary motion into a non-uniform motion without making the rotation axis of an input shaft eccentric from that of an output shaft and without using any gears.

A power transmission device for a press machine of the present invention comprises first transmission means rotated around a first axis upon receipt of a rotational force of a fly-wheel; second transmission means connected to the first transmission means so as to be rotated around a second axis made eccentric from the first axis by the rotation of the first transmission means; third transmission means pivotally connected to the second transmission means so as to be rotated around the first axis by the rotation of the second transmission means and also connected to a crankshaft so as to rotate the crankshaft; and regulation means for regulating the rotary motion of the second transmission means relative to the second rotation axis to a rotational movement along a hypothetical circle centered on the second axis, wherein the second transmission means is provided with a first link pivotally connected to the first transmission means and a second link connected pivotally to the first link and the third transmission means at different portions respectively, and the second transmission means is engaged with the regulation means at an engagement portion moved along the hypothetical circle in accordance with the rotation of the second transmission means.

The first transmission means performs a uniform rotary motion in accordance with the uniform rotary motion of a fly-wheel. However, since the motion of the engagement portion of the second transmission means is regulated by the regulation means to the rotational movement along the hypothetical circle centered around the second axis made eccentric from the first axis, the second transmission means converts the uniform rotary motion of the fly-wheel into the non-uniform rotary motion by the fact that the second transmission means is rotationally moved around the second axis. This non-uniform rotary motion is transmitted to the third transmission means and further to the crankshaft by the third transmission means.

When the uniform rotary motion is converted into the non-uniform rotary motion, each of the neighboring transmission means makes a relatively angular rotation, that is, a bending and extending motion, at a pivotal connection point. Each of the links makes a relatively angular rotation at a pivotal connection point, and the second transmission means makes an angular rotation, that is, an oscillating motion, at the engagement portion with the regulation means. By so doing, the difference between the angular velocity of the first transmission means for making the uniform rotary motion and the angular velocity of the third transmission means for making the non-uniform rotary motion is absorbed.

The rotational position of the third transmission means relative to the rotational angle of the first transmission means, that is, the reciprocating motion position of a slide varies depending on the distance between the first axis and the second axis, the displacement direction of the second axis to the first axis and the distance between the connection portions of the neighboring members.

According to the present invention, the first and third transmission means substantially take the first axis in common as a rotation axis, the second transmission means has the first and second links pivotally connected with each other, and further, the rotary motion of the second transmission means is regulated to the rotational movement along the hypothetical circle centered around the second axis which is made eccentric from the first axis. Therefore, any uniform rotary motions can be converted into non-uniform rotary motions without using any gears as these first and second transmission means, and any unbalanced forces do not act among the first, second and third transmission means. In addition, the axis of the input shaft substantially coincides with that of the output shaft and a less amount of vibration is generated.

It is preferable that the regulation means be provided with a rotor pivotally connected to the second transmission means at the engagement portion thereof and rotated around the second axis. Accordingly, the rotational movement of the engagement portion along the hypothetical circle is ensured.

Furthermore, it is preferable that the regulation means include a guide for guiding the rotation of the rotor around the second axis and disposed in the press machine so as to be able to change a mounted position around the second axis. Accordingly, the rotational movement of the engagement portion along the hypothetical circle is much more ensured. In addition, the rotational position of the third transmission means relative to the rotational angle of the first transmission means, that is, the displacement direction of the second axis to the first axis, can be changed by changing a position to mount the guide on the press machine around the second axis.

The first transmission means can be provided with a rotary shaft rotated around the first axis upon receipt of the rotation of the fly-wheel, and an arm mounted on the rotary shaft and pivotally connected to the first link.

It is preferable that the first transmission means be rotatably disposed at the crankshaft so that the first axis may substantially coincide with the rotation axis of the crankshaft. Thereby, since there is no need to provide any member for supporting the first transmission means on a frame of the press machine, the dimension of the device can be miniaturized and the production cost can be also saved in comparison with those of any devices known per se.

It is preferable that the third transmission means be provided with a lever pivotally connected to the second link and mounted on the crankshaft. Thereby, since there is no need to provide any member for supporting the third transmission means on the frame of the press machine, the dimension of the device can be miniaturized and the production cost can be also saved in comparison with those of any devices known per se.

It is preferable that the third transmission means be unrotatably disposed at the crankshaft. Thereby, since there is no need to provide any member for supporting the third transmission means on the frame of the press machine, the dimension of the device can be miniaturized.

It is preferable that the first axis be substantially same as the rotation axis of the fly-wheel, and it is also preferable that the first axis be substantially same as the rotation axis of the crankshaft. Thereby, in any of the cases, the dimension of the device can be miniaturized and the production cost can also be saved in comparison with those of any devices known per se.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
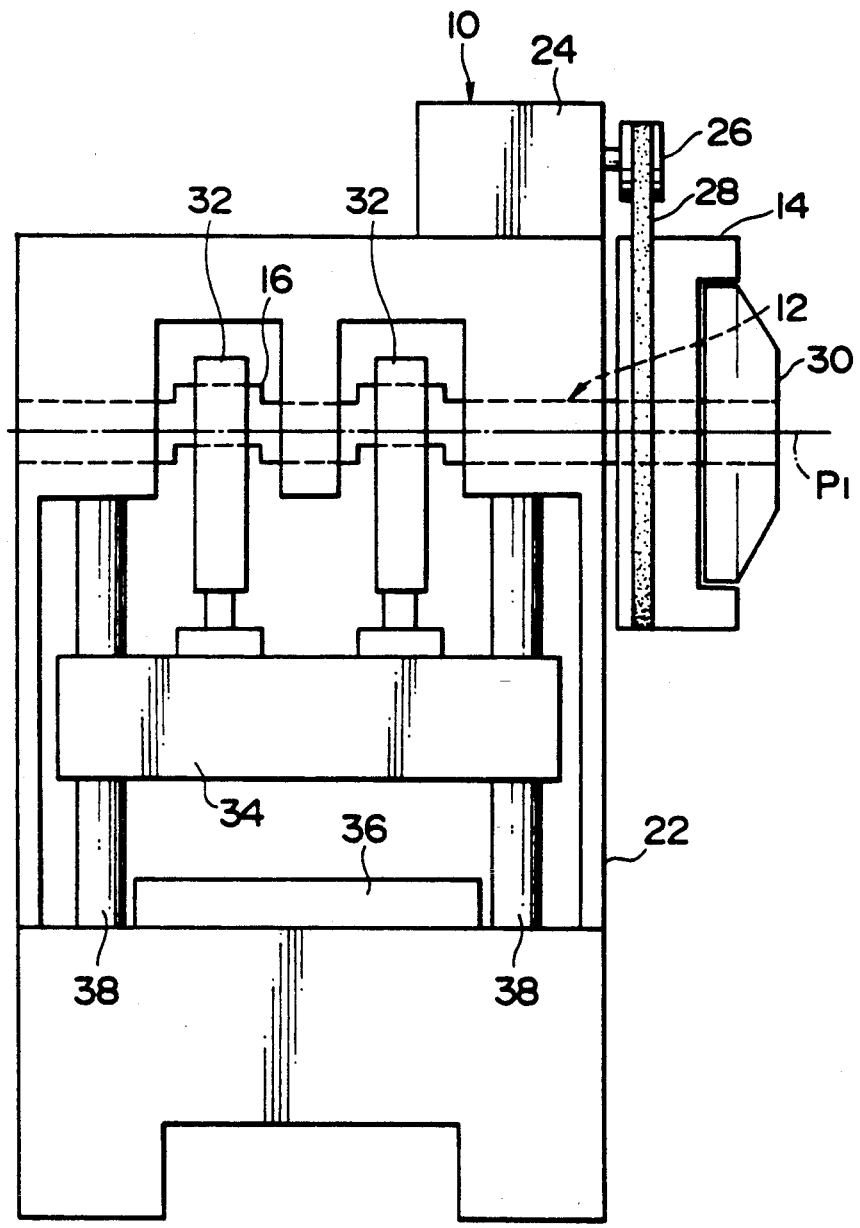
FIG. 1 is a front view showing a press machine incorporated with a power transmission device as a preferred embodiment of the present invention.

Referring now to FIG. 1, a press machine 10 has a power transmission device 12 disposed between a fly-wheel 14 and a crankshaft 16.

The fly-wheel 14 is rotatably supported to the power transmission device 12 around an axis extending in a horizontal direction by a plurality of bearings 18 as shown in FIGS. 3 through 6. On the other hand, the crankshaft 16 is rotatably supported to a frame 22 of the press machine 10 around an axis extending in a horizontal direction by a plurality of bearings 20. The rotation axis of the fly-wheel 14 and that of the crankshaft 16 are both a first axis P1.

The rotation of a motor 24 mounted on the frame 22 is transmitted to the fly-wheel 14 by a pulley 26 mounted on the rotary shaft of the motor 24, and a belt 28 hung around the fly-wheel 14 and the pulley 26, and further, the rotation is transmitted from the fly-wheel 14 to the crankshaft 16 through a clutch and brake mechanism 30 known per se and provided in connection with the fly-wheel and the power transmission device 12.

The crankshaft 16 has two eccentric portions and also supports a common slide 34 at the eccentric portions through a connector 32. The slide 34 is reciprocated in a vertical direction relative to a bolster 36 mounted on the frame 22 in accordance with the rotation of the crankshaft 16. The displacement of the slide 34 in a horizontal direction is regulated by a pair of guide rods 38 mounted on the frame 22 in parallel with each other.

As shown in FIGS. 2 through 6, the power transmission device 12 comprises a rotary shaft 40 for receiving the rotary motion of the fly-wheel 14 through the clutch and brake mechanism 30, an arm 42 mounted on the end of the rotary shaft 40 in one end portion, a first link 44 connected to the other end of the arm 42 in one end portion; a rotor 46 pivotally connected to a second link 48 on a hypothetical circle 66 (refer to FIG. 2) centered around a second axis P2 (refer to FIG. 2) made eccentric from the first axis Pl, the rotor being rotatable around the second axis P2, the second link 48 connected to the other end of the first link 44 in one end portion and a lever 50 connected to the other end of the second link 48 in one end portion.

The arm 42 and the first link 44, the first link 44 and the second link 48, the second link 48 and the rotor 46, and the second link 48 and the lever 50 are pivotally and movably connected by means of pins 52, 54, 56 and 58, respectively. The pivotal points of the pins 52, 54, 56 and 58 are defined as P52, P54, P56 and P58, respectively.

The rotary shaft 40 is rotatably supported to the crankshaft 16 by a plurality of bearings 60 so that a rotation axis of the rotary shaft may coincide with the first axis Pl. At the same time, the rotary shaft 40 rotatably supports the fly-wheel 14 by a plurality of bearings 18, and further relatively unrotatably supports the clutch and brake mechanism 30.

The arm 42 is unrotatably mounted on the rotary shaft 40 so that the rotation axis of the arm 42 may coincide with the first axis P1. The lever 50 is relatively unrotatably mounted on the crankshaft 16 so that the rotation axis of the lever 50 may coincide with the first axis P1 and a rotary motion thereof is transmitted to the crankshaft 16.

The power transmission device 12 further comprises a cylindrical guide 62 extending around the crankshaft 16. The guide 62 is mounted on the side portion of the frame 22 by a plurality of bolts or the like so as to be able to change the direction for mounting the guide 62 around the second axis P2. The guide 62 has a guide surface centered around the second axis P2 on an external surface thereof.

The rotor 46 is supported by a plurality of the bearings 64 rotatably around the second axis P2 to the guide surface of the guide 62. The rotor 46 is connected to the second link 48 pivotally and movably around the pivot P56 by the pin 56 in a projection portion 46a of the rotor 46. Therefore, the pivotal connection point between the rotor 46 and the second link 48 makes a rotational movement on the hypothetical circle 66 centered around the second axis P2 and passing through the pivotal point P56 in accordance with the rotational movements of the rotor 46 and the second link 48.

Figure 2:
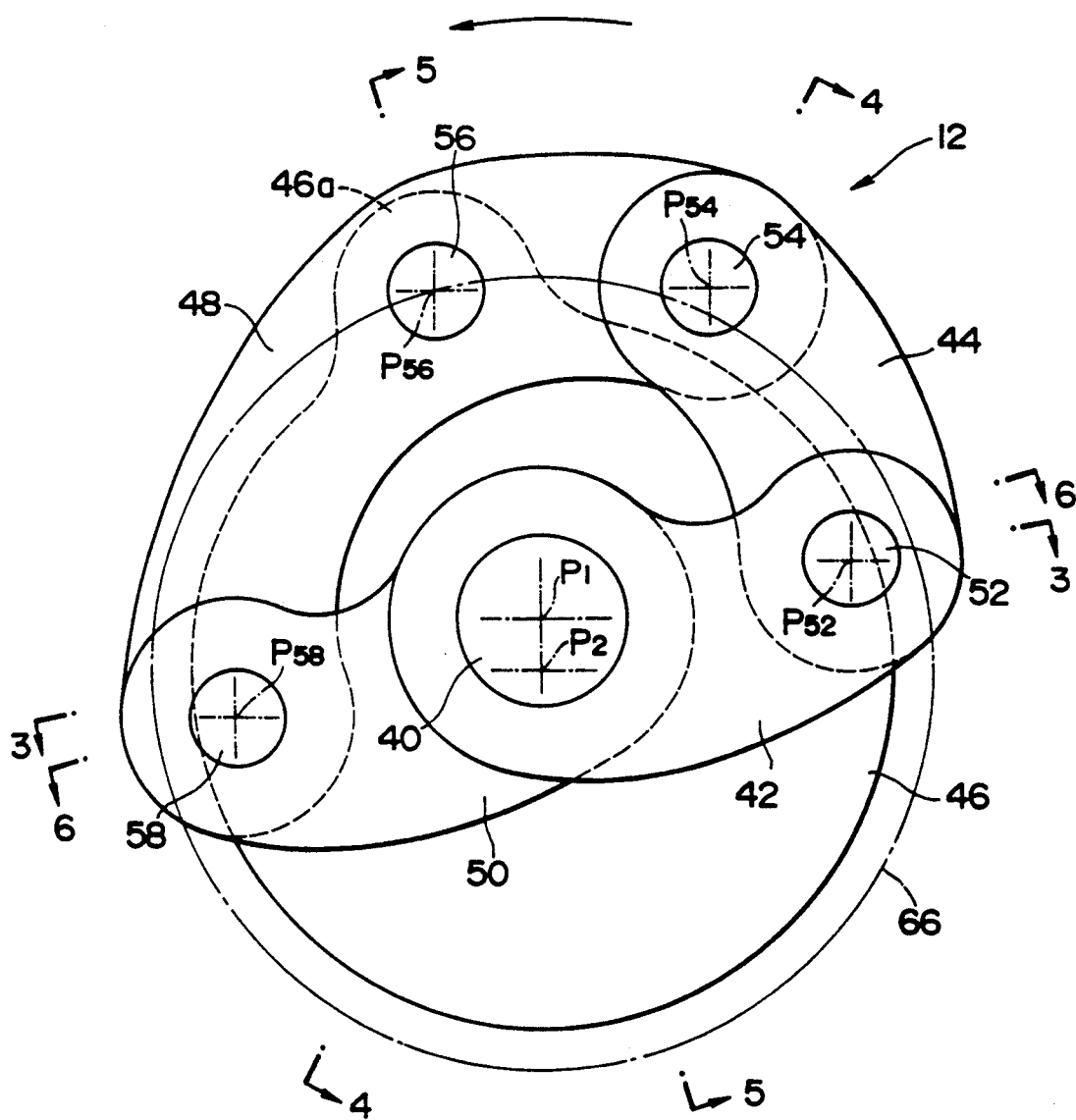
FIG. 2 is a right side view showing a power transmission device as a preferred embodiment of the present invention.
Figure 3:
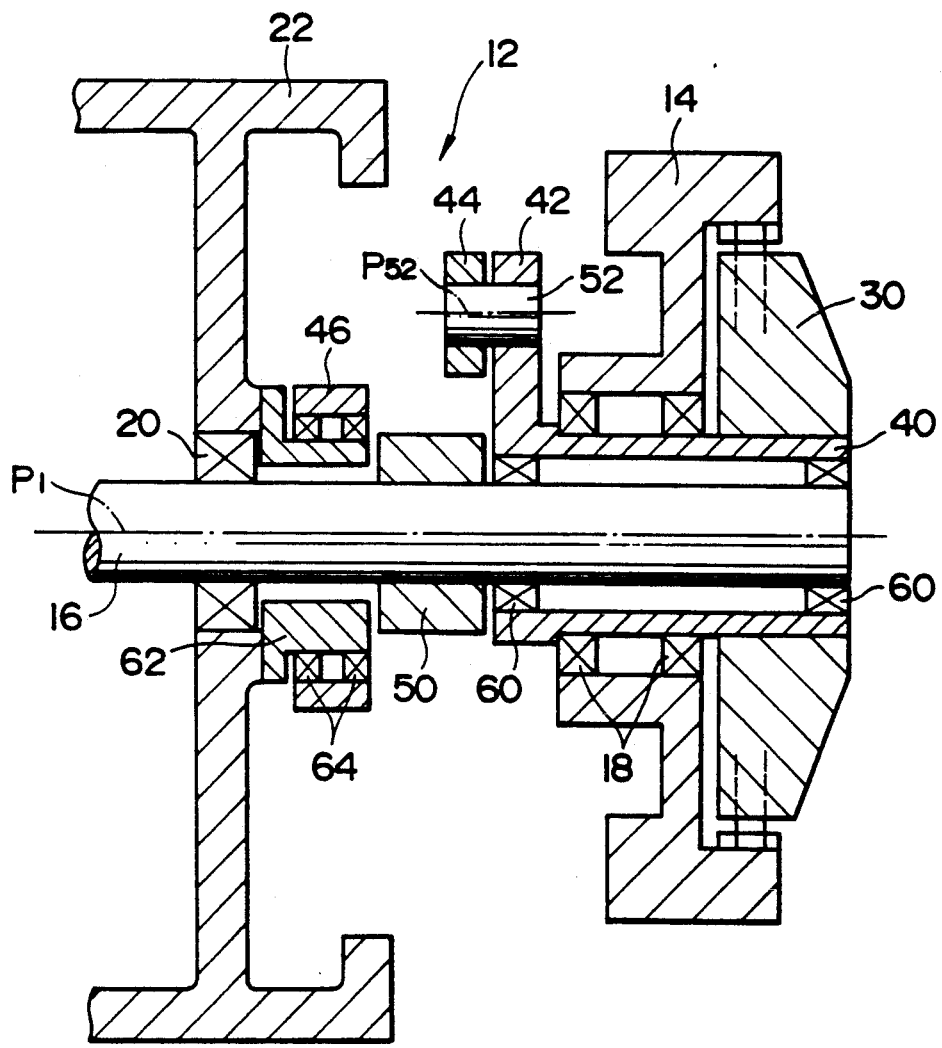
FIG. 3 is a sectional view taken along line 3—3 of FIG. 2.
Figure 4:
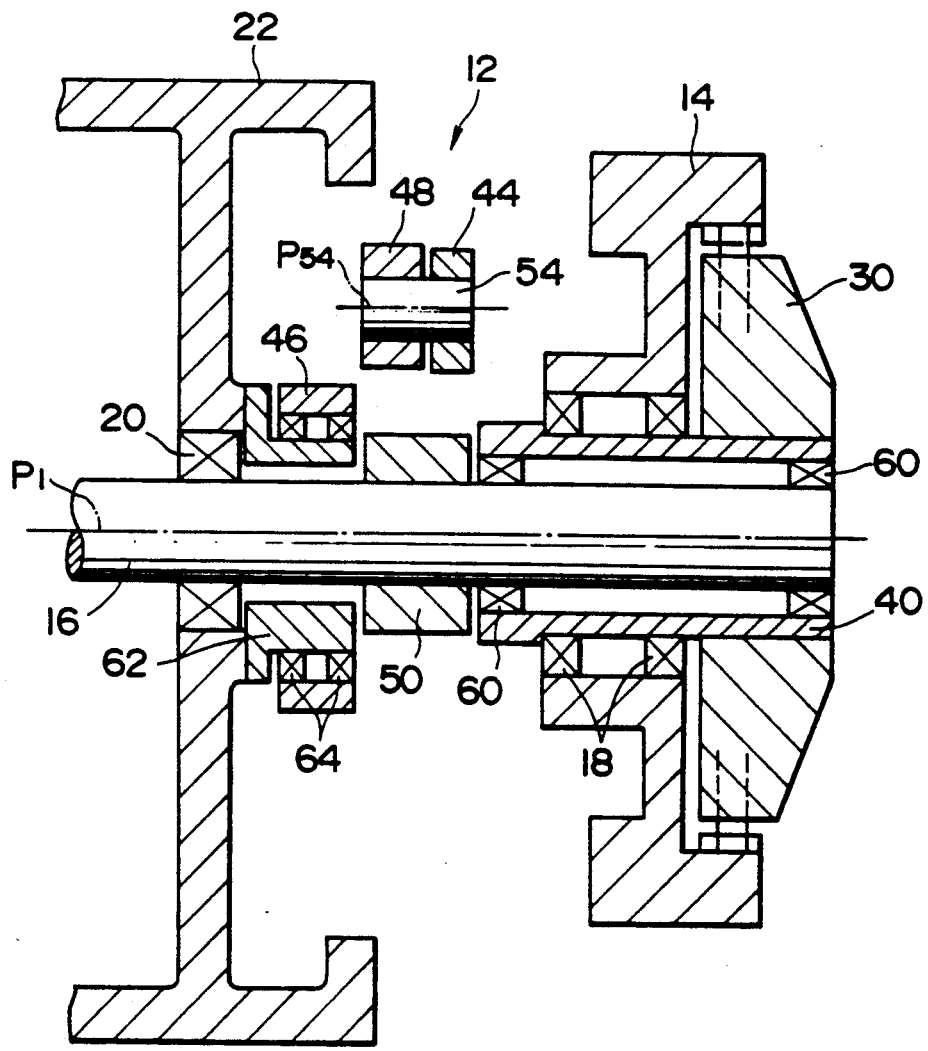
FIG. 4 is a sectional view taken along line 4—4 of FIG. 2.
Figure 5:
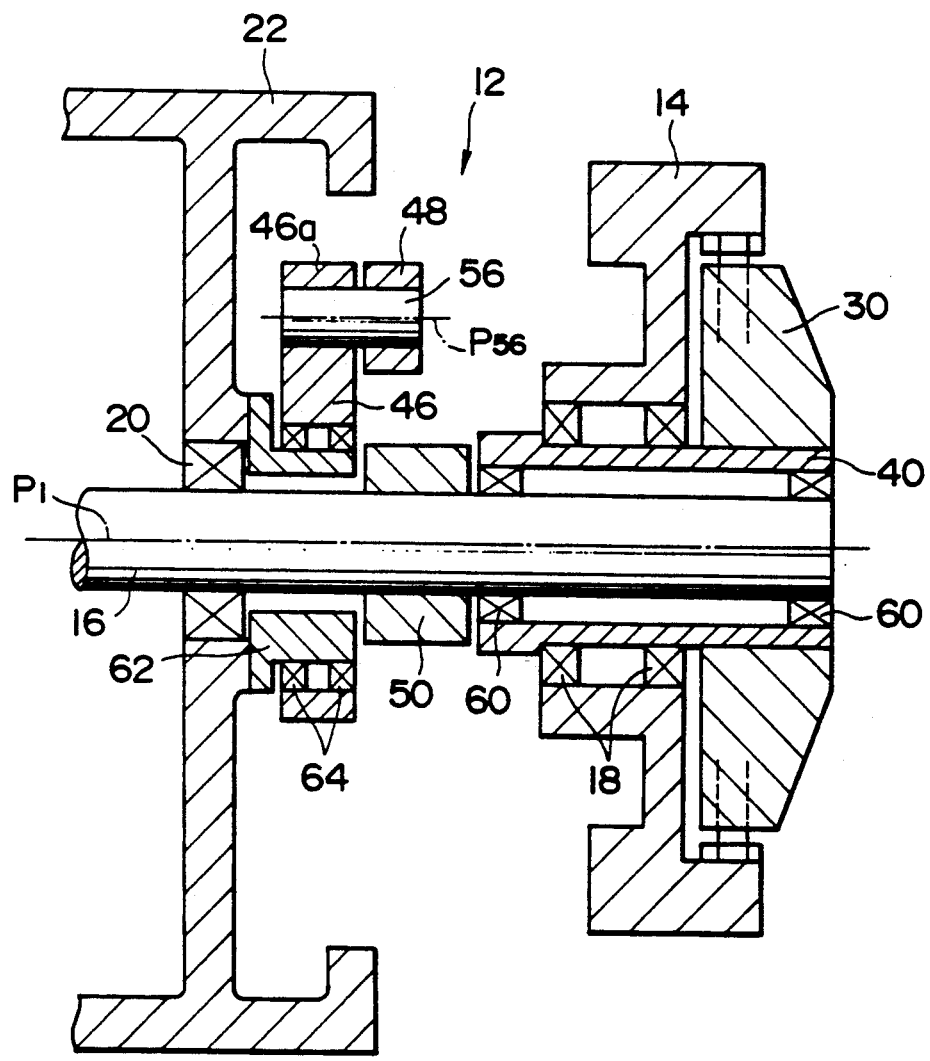
FIG. 5 is a sectional view taken along line 5—5 of FIG. 2.
Figure 6:
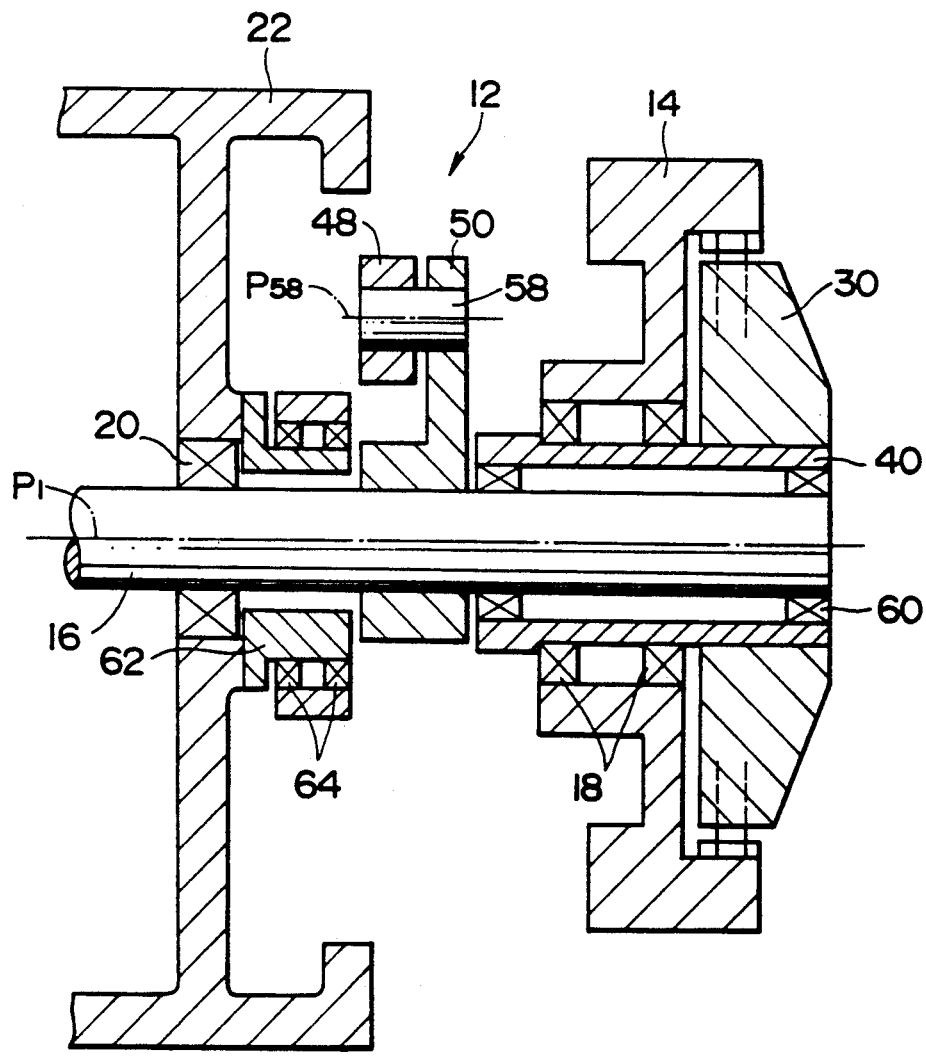
FIG. 6 is a sectional view taken along line 6—6 of FIG. 2.

When the rotation of the fly-wheel 14, e.g., a rotation in a direction indicated by an arrow in FIG. 2, is transmitted to the rotary shaft 40 through the clutch and brake mechanism 30, the arm 42 is rotated together with the rotary shaft 40, so that the first link 44, the rotor 46, the second link 48 and the lever 50 are rotated, respectively, and the crankshaft 16 is ultimately rotated by the lever 50.

In accordance with the rotation of the rotary shaft 40, the arm 42 is rotated while being centered around the first axis P1. On the other hand, the connection portion between the second link 48 and the rotor 46, that is the pivotal point P56 is rotated along the hypothetical circle 66 centered around the second axis P2. Therefore, in accordance with the uniform rotary motion of the fly-wheel 14, the rotary shaft 40 and the arm 42 make a uniform rotary motion around the first axis P1, while the second link 48 makes a non-uniform rotary motion around the second axis P2. For this reason, the crankshaft 16 and the lever 50 make a non-uniform rotary motion around the first axis P1 in accordance with the uniform rotary motion of the fly-wheel 14.

When the uniform rotary motion is converted into the non-uniform rotary motion, each pair of the arm 42 and the first link 44, the first link 44 and the second link 48, and the second link 48 and the lever 50 makes a relatively angular rotation around each pivotal point P52, P56 or P58, that is, a bending and extending motion, and the second link 48 makes an angular rotation relative to the rotor 46 centered around the pivotal point P56. Accordingly, the difference between the angular velocities of the rotary shaft 40 and the arm 42 making a uniform rotary motion and that of the lever 50 making a non-uniform rotary motion is absorbed.

The rotary speed of the lever 50 relative to the rotational angle of the rotary shaft 40, that is, the reciprocating velocity of the slide 34 varies depending on the distance (eccentricity) between the axes P1 and P2, the distances between the axes P1 and P52, between the axes P53 and P54, between the axes P54 and P56, between the axes P56 and P58, and between the axes P1 and P58, and the rotational angle (displacement direction) of a line connecting between the axes P1 and P2 to a horizontal line.

The displacement direction of the second axis P2 to the first axis P1 can be changed, e.g., by changing the position for mounting the guide 62 on the press machine to that around the second axis P2. Instead of the cylindrical guide having the external surface used as the guide surface for the rotor, a ring type guide having an internal surface used as the guide surface for the rotor may be used as well.

Figure 7:
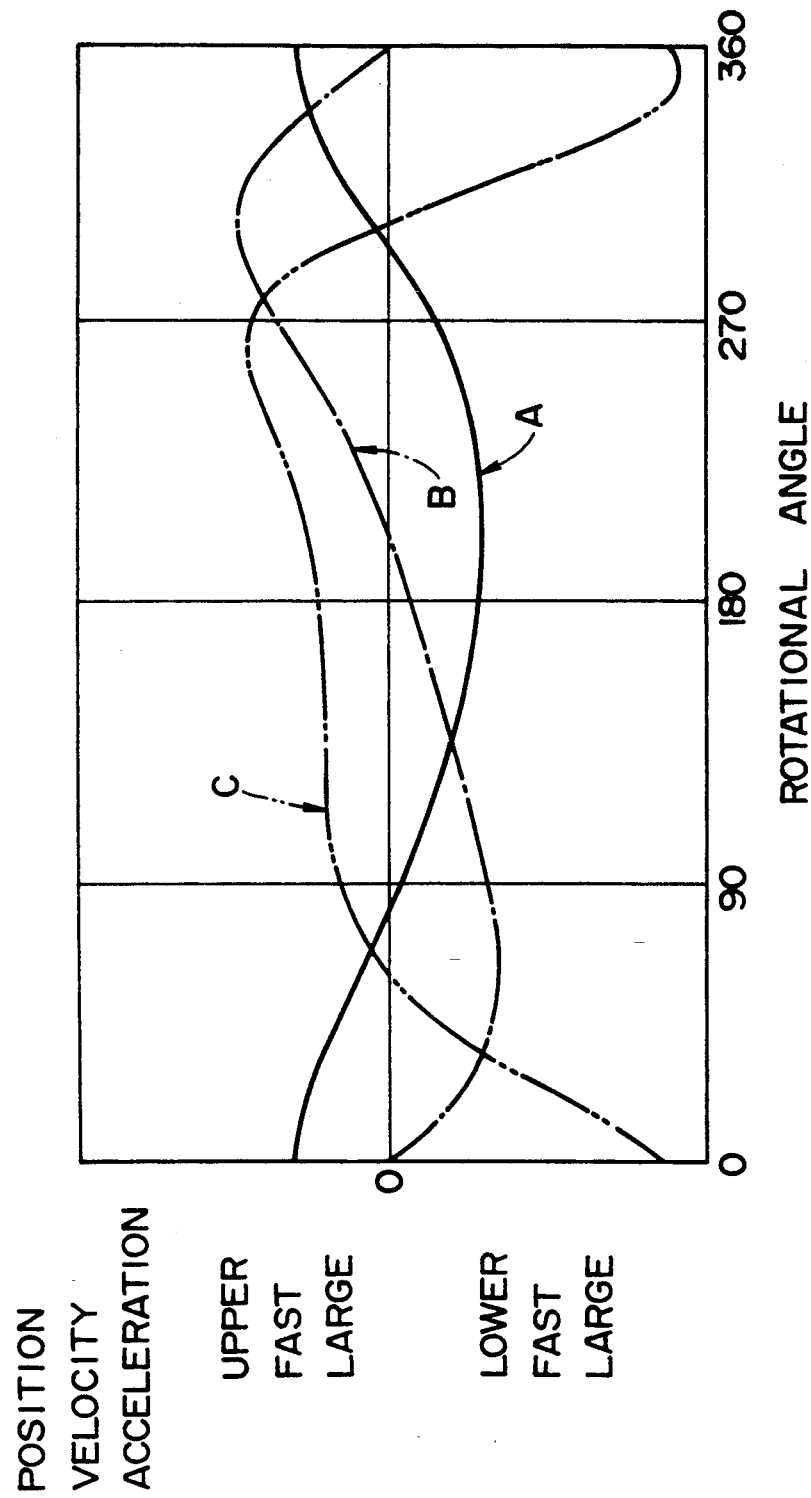
FIG. 7 is a diagrammatic view showing a relation of the position in a vertical direction, the reciprocating velocity and acceleration of a slide relative to the rotational angle of a rotary shaft.

The position in a vertical direction, the reciprocating velocity and the acceleration of the slide 34 relative to the rotational angle of the rotary shaft 40 are shown by curves A, B and C in FIG. 7, respectively. As apparent from FIG. 7, in the preferred embodiment described above, the bottom dead center in the slide 34 is available when the rotary shaft 40 rotates at approximately 200 degrees. The slide 34 gradually descends and rapidly ascends. That is, the uniform rotary motion of the fly-wheel 14 is converted by the power transmission device 12 into a non-uniform rotary motion which gradually descends the slide 34 and then rapidly ascends the slide 34.

According to the power transmission device 12, the fly-wheel 14, the rotary shaft 40, the arm 42 and the lever 50 have a rotation axis in common. Therefore, the unbalanced force acting on each member is small, and the device is miniaturized and becomes simple in comparison with those of the device known per se and having axes different from each other. Since the lever 50 is mounted on the crankshaft 16, the device can be easily incorporated in any existing press machines. Furthermore, since the rotation axis of the input shaft coincides with that of the output shaft, there is no need to specifically provide any casing for supporting the input shaft.

In case an unbalanced force accompanied by the rotations of the arm 42, the first link 44, the rotor 46, the second link 48 and the lever 50 has a problem, a balancing spindle may be mounted on the rotary shaft 46 or the crankshaft 16. A disc may be also used instead of the arm 42 and the lever 50. In addition, instead of directly mounting the lever 50 on the crankshaft 16, an output shaft with the lever 50 attached may be provided and connected to the crankshaft. In this case, the lever 50 may be rotated around a rotation axis which is different from the rotation axis of the crankshaft 16.

Figure 8:
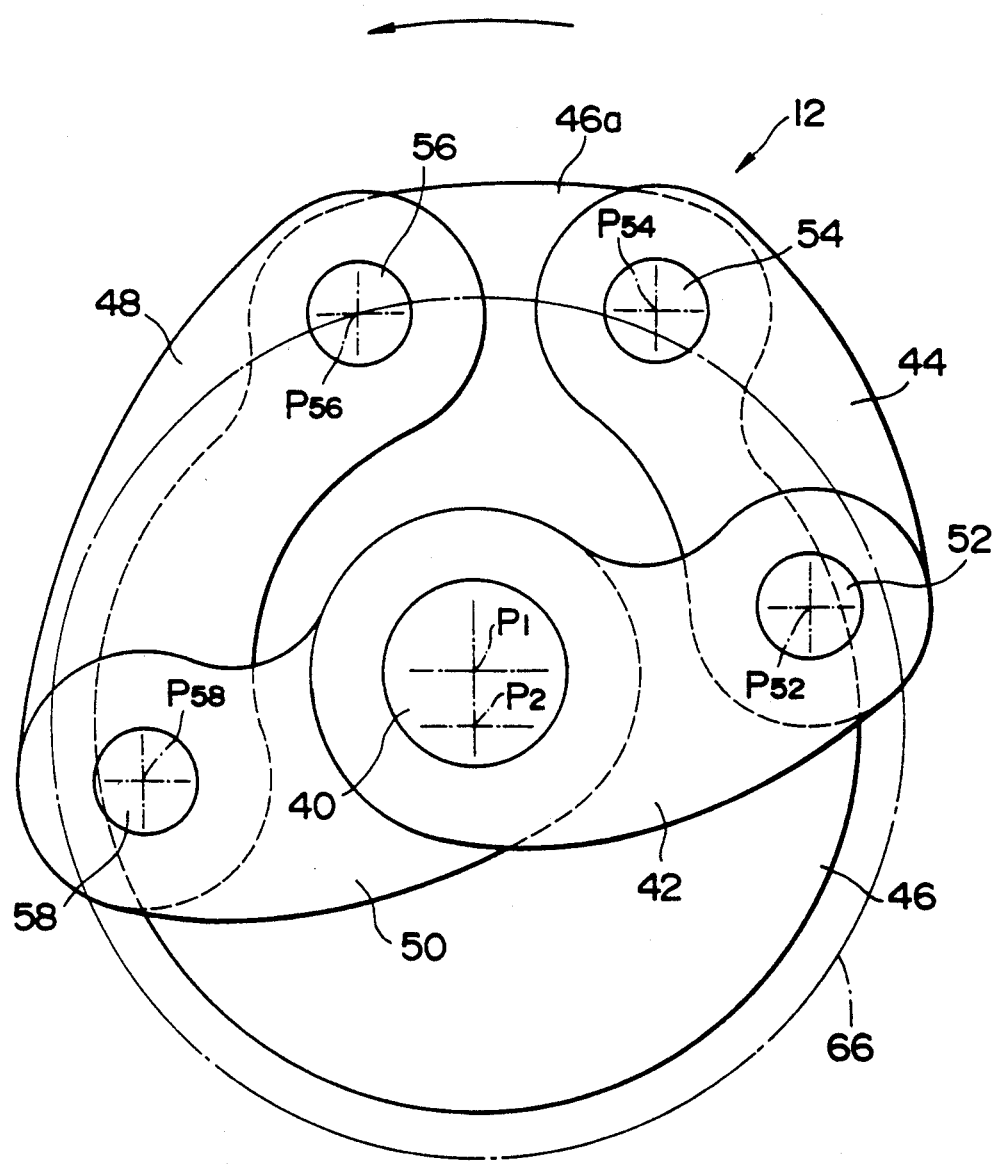
FIG. 8 is a right side view showing a first modification of the power transmission device of FIG. 2.
Figure 9:
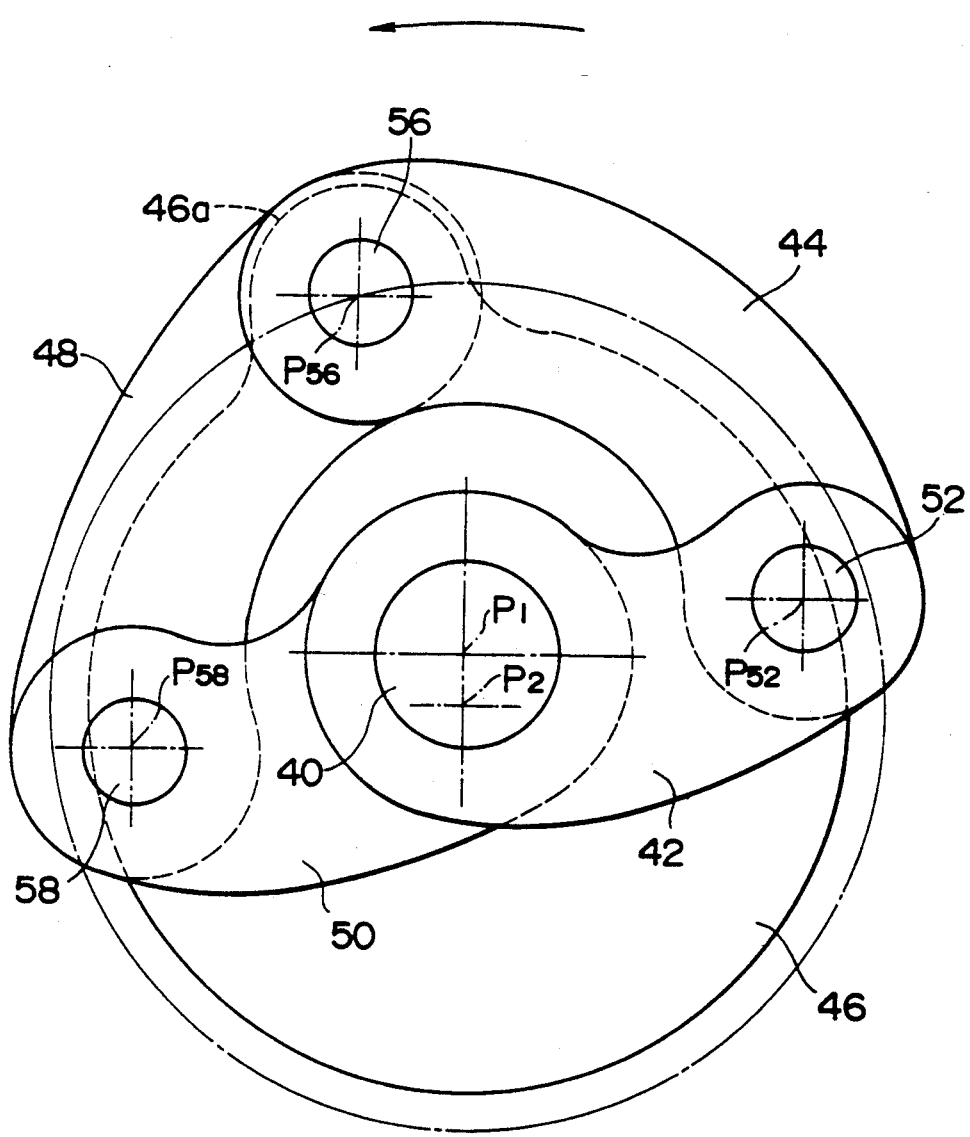
FIG. 9 is a right side view showing a second modification of the power transmission device of FIG. 2.
Figure 10:
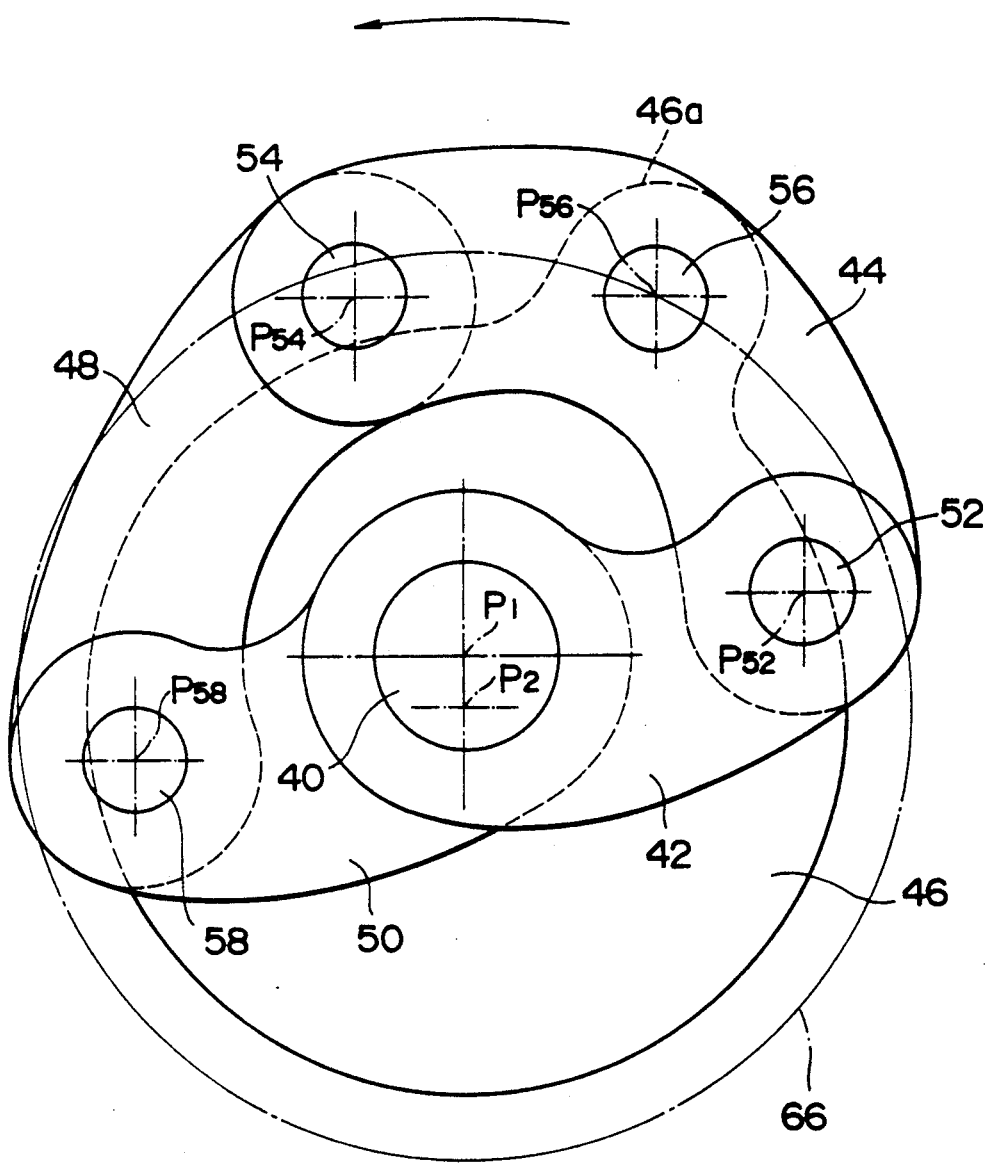
FIG. 10 is a right side view showing a third modification of the power transmission device of FIG. 2.
Figure 11:
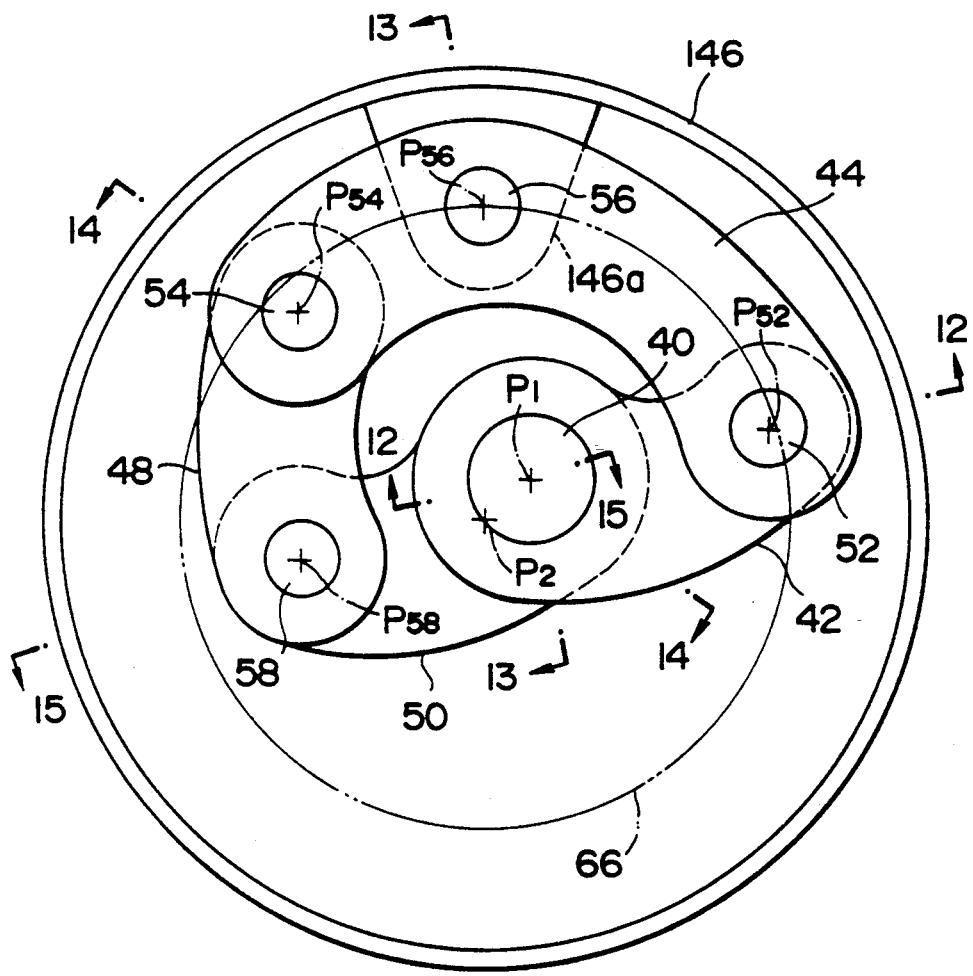
FIG. 11 is a right side view showing a power transmission device as another embodiment of the present invention.
Figure 12:
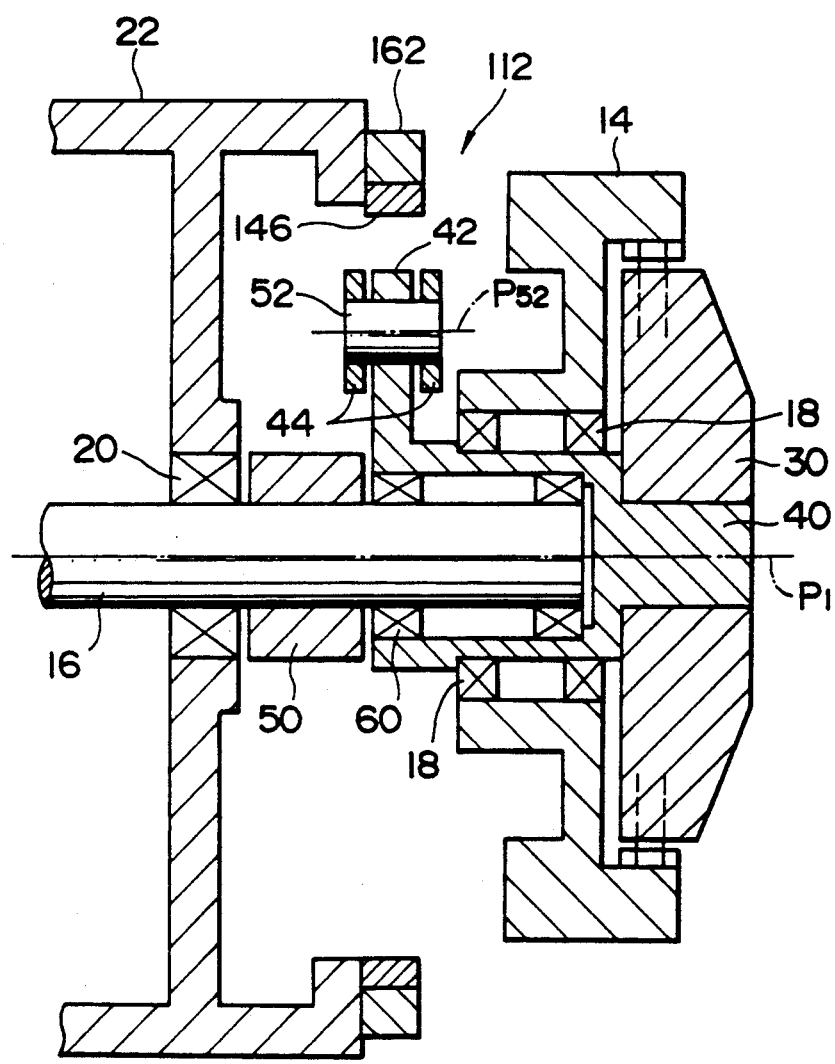
FIG. 12 is a sectional view taken along line 12—12 of FIG. 11.
Figure 13:
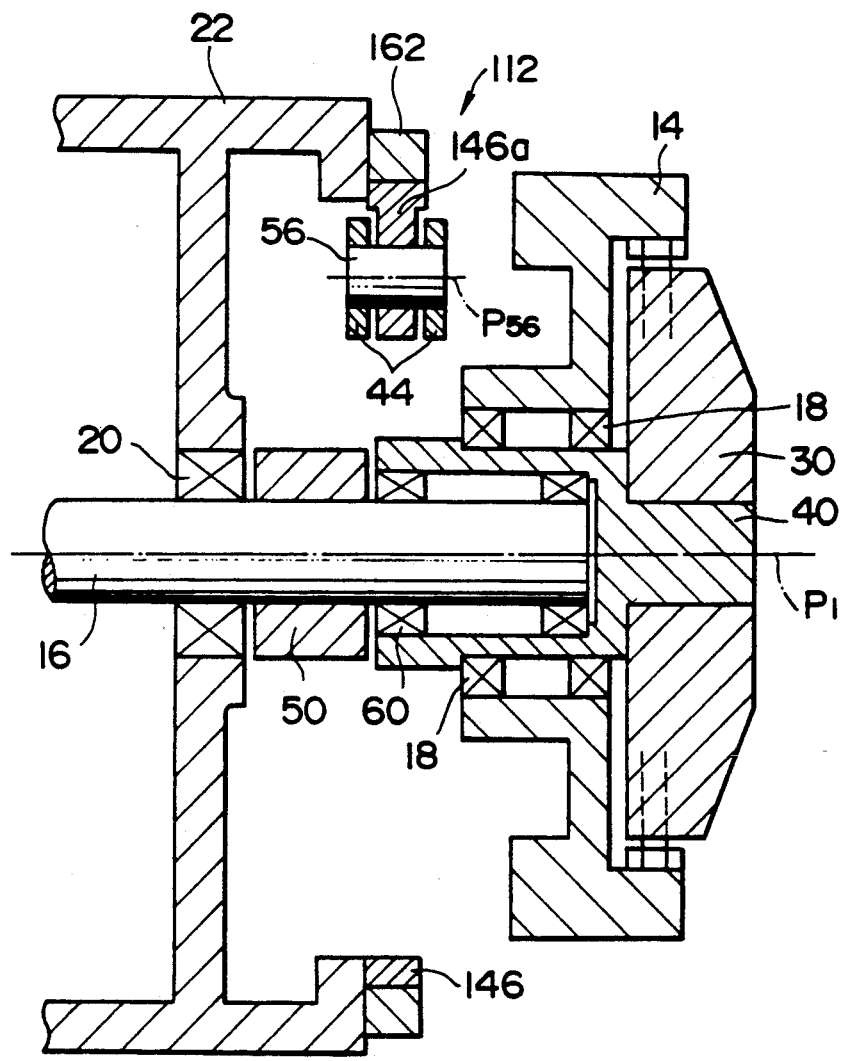
FIG. 13 is a sectional view taken along line 13—13 of FIG. 11.
Figure 14:
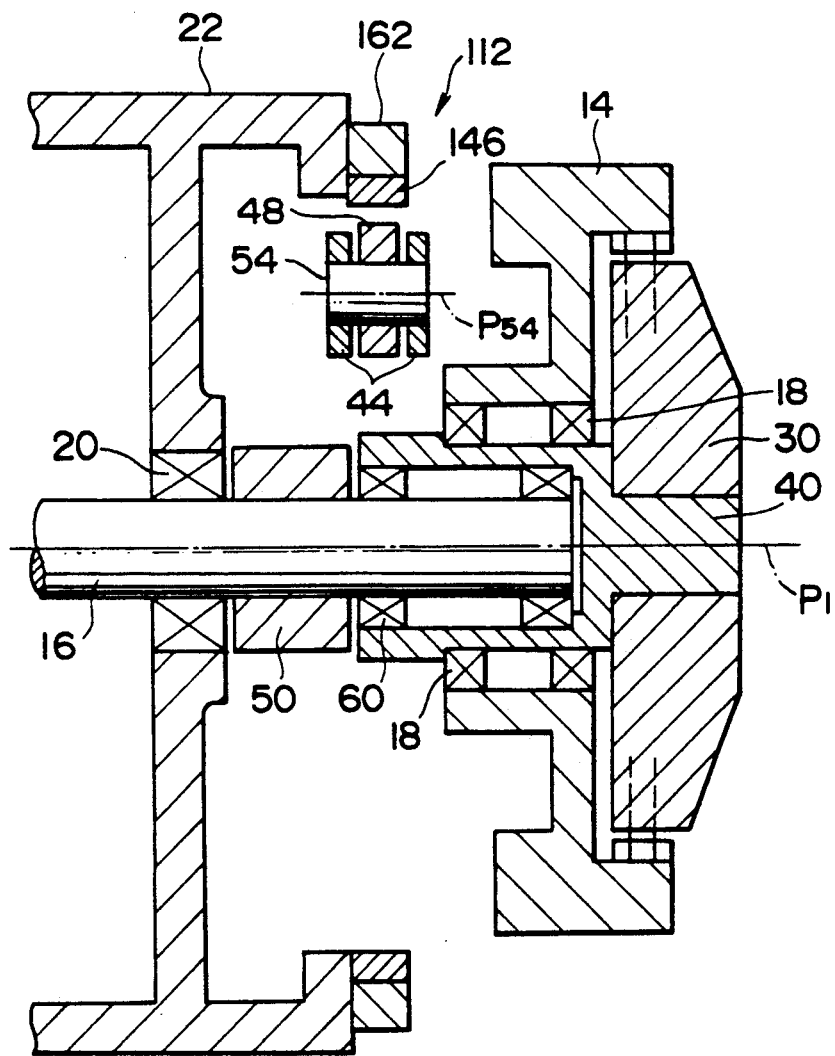
FIG. 14 is a sectional view taken along line 14—14 of FIG. 11.
Figure 15:
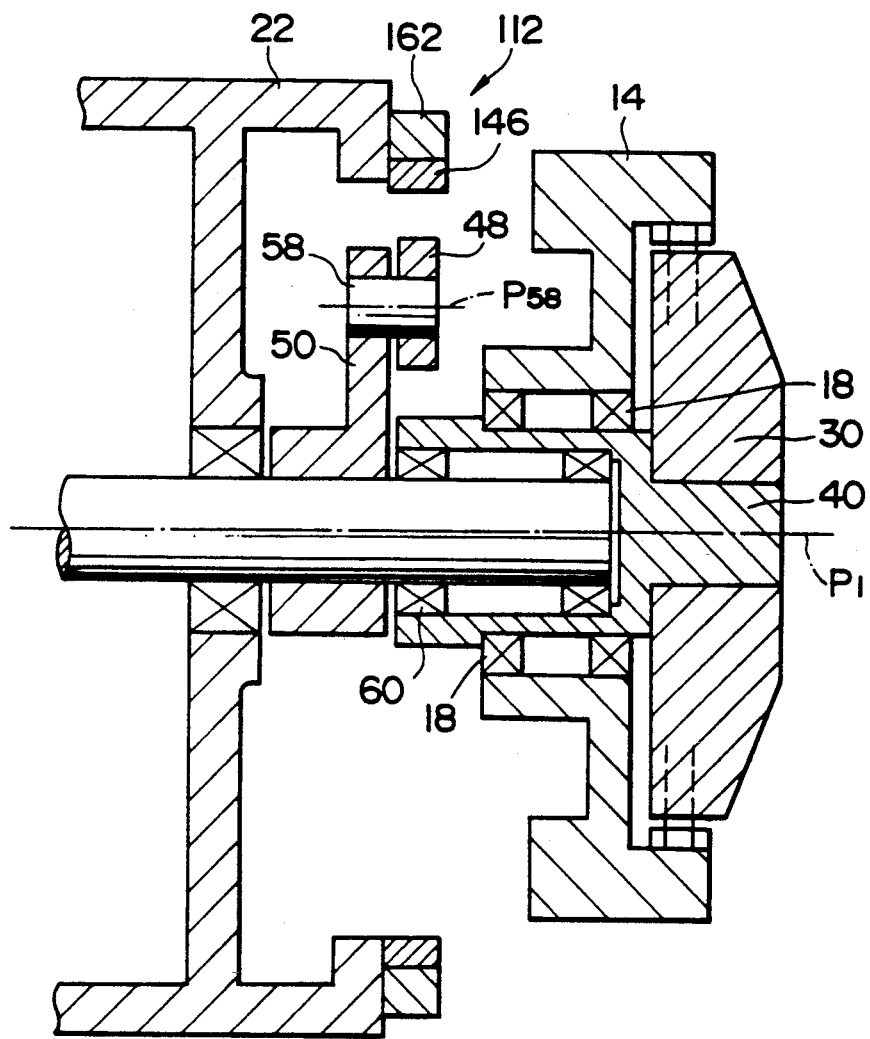
FIG. 15 is a sectional view taken along line 15—15 of FIG. 11.

Instead of pivotally connecting the first link 44 to the second link 48 in the power transmission device 12, the first link 44 may be pivotally connected by the pin 54 to a projection 46a of the rotor 46 as shown in FIG. 8. In addition, as shown in FIG. 9, the first link 44, the second link 48 and the projection 46a of the rotor 46 may be pivotally connected by the pin 56 to one another. Furthermore, as shown in FIG. 10, the first link 44 may be pivotally connected by the pin 56 to the projection 46a of the rotor 46, and the first and second links 44 and 48 may be pivotally connected by the pin 54 to each other.

Referring now to FIGS. 11 through 15, a power transmission device 112 is different from the power transmission device 12 in view of pivotally connecting the first link 44 to a rotor 146 by the pin 56 and pivotally connecting the first and second links 44 and 48 to each other by the pin 54, using a ring-type guide 162 having an internal surface serving as a guide surface for the rotor, as a guide to be used for the rotor making a rotational movement around the second axis P2. The guide 162 is mounted on a side portion of the frame 22 of the press machine.

Instead of pivotally connecting the second link 48 to the first link 44 even in the power transmission device 112, the second link 48 may be pivotally connected by the pin 54 to a projection 146a of the rotor 146. In addition, the first link 44, the second link 48 and the projection 146a of the rotor 146 may be pivotally connected by the pin 56 to one another. Furthermore, the second link 48 may be pivotally connected by the pin 56 to the projection 146a of the rotor 146, and the first and second links 44 and 48 are pivotally connected by the pin 54 to each other.

What is claimed is:

1. A power transmission device for a press machine for transmitting rotation of a fly-wheel to a crankshaft, comprising:

first transmission means rotated around a first axis upon receipt of the rotation of said fly-wheel;

second transmission means connected to said first transmission means so as to be rotated around a second axis made eccentric from said first axis by the rotation of said first transmission means;

third transmission means pivotally connected to said second transmission means so as to be rotated around said first axis by the rotation of said second transmission means, and connected to said crankshaft so as to rotate said crankshaft; and regulation means for regulating the rotary motion of said second transmission means relative to said second axis to a rotational movement along a hypothetical circle centered on said second axis;

wherein said second transmission means includes a first link pivotally connected to said first transmission means and a second link pivotally connected to said first link and said third transmission means at different portions, respectively; and said second transmission means is engaged with said regulation means at an engagement portion moved along said hypothetical circle in accordance with the rotation of the second transmission means.

2. A power transmission device according to claim 1, wherein said regulation means includes a rotor pivotally connected to said second transmission means at said engagement portion and rotated around said second axis.

3. A power transmission device according to claim 2, wherein said regulation means further includes a guide for guiding the rotation of said rotor around said second axis and disposed at said press machine so as to be able to change a mounted position thereof around said second axis.

4. A power transmission device according to claim 1, wherein said first transmission means includes a rotary shaft rotated around said first axis upon receipt of the rotation of said fly-wheel and an arm mounted on said rotary shaft and pivotally connected to said first link.

5. A power transmission device according to claim 1, wherein said first transmission means is rotatably disposed at said crankshaft so that said first axis may be substantially same as the rotation axis of said crankshaft.

6. A power transmission device according to claim 1, wherein said third transmission means includes a lever pivotally connected to said second link and disposed at said crankshaft so as to be rotated around said first axis by the rotation of said second transmission means.

7. A power transmission device according to claim 1, wherein said third transmission means is unrotatably disposed at said crankshaft.

8. A power transmission device according to claim 1, wherein said first axis is substantially the same as the rotation axis of said fly-wheel.

9. A power transmission device according to claim 1, wherein said first axis substantially coincides with the rotation axis of said crankshaft.

* * * * *